(12) United States Patent
Price et al.

(10) Patent No.: US 10,216,467 B2
(45) Date of Patent: Feb. 26, 2019

(54) SYSTEMS AND METHODS FOR AUTOMATIC CONTENT VERIFICATION

(71) Applicant: Google Inc., Mountain View, CA (US)

(72) Inventors: Thomas Price, San Francisco, CA (US); Tuna Toksoz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 15/014,733

(22) Filed: Feb. 3, 2016

(65) Prior Publication Data

US 2017/0220306 A1 Aug. 3, 2017

(51) Int. Cl.
| | |
|---|---|
| G06F 3/00 | (2006.01) |
| G06F 3/14 | (2006.01) |
| G06F 3/0481 | (2013.01) |
| G06F 3/0484 | (2013.01) |
| G06T 7/00 | (2017.01) |
| H04L 29/08 | (2006.01) |
| H04L 29/06 | (2006.01) |
| G06F 17/30 | (2006.01) |

(52) U.S. Cl.
CPC .......... *G06F 3/1415* (2013.01); *G06F 3/0481* (2013.01); *G06F 3/0484* (2013.01); *G06F 17/30256* (2013.01); *G06F 17/30905* (2013.01); *G06T 7/0002* (2013.01); *G06T 7/0022* (2013.01); *H04L 67/10* (2013.01); *H04L 67/42* (2013.01)

(58) Field of Classification Search
CPC ....... H04L 67/42; H04L 67/10; G06F 3/0481; G06F 3/1415
USPC ........................................................ 715/744
See application file for complete search history.

(56) References Cited

U.S. PATENT DOCUMENTS

| | | |
|---|---|---|
| 6,226,407 B1 | 5/2001 | Zabih et al. |
| 2008/0243571 A1 | 10/2008 | Edelman |
| 2011/0231823 A1 | 9/2011 | Fryc et al. |
| 2013/0004087 A1 | 1/2013 | Kumar et al. |

(Continued)

FOREIGN PATENT DOCUMENTS

EP 2 889 833 7/2015

OTHER PUBLICATIONS

An enhanced screen capture method in Jan. 17, Translation Verification Test, IP.Com Journal IP.Com Inc West, Henrietta NY US, Nov. 2015 Nov. 4, 2015 XP013168321, ISSN 1533-0001, the whole document.

(Continued)

*Primary Examiner* — William Titcomb
(74) *Attorney, Agent, or Firm* — Foley & Lardner LLP (57) ABSTRACT

A method of automatic content verification may include requesting, from a server by an application executed by a client device, an item of content for display to a user of the client device, the request comprising environmental information related to an environment in which the item of content is to be rendered on the client device. A network interface of the client device may receive, from the server, the requested item of content. A renderer of the client device integrated with the application may render the received item of content. A capture module of the client device integrated with the application may capture an image of the rendered item of content. The network interface of the client device may transmit, to the server, the captured image, the server comparing the captured image to a predetermined image to identify any rendering distortion.

20 Claims, 5 Drawing Sheets

(56) References Cited

U.S. PATENT DOCUMENTS

2013/0347019 A1  12/2013  Herlein et al.
2014/0067550 A1  3/2014   Chang
2015/0106831 A1  4/2015   Todd

OTHER PUBLICATIONS

Etrusoft Screen Capture Jan. 17, Timer-activated capture History catalog, overview Manage images with History bar, Internet Citation, Apr. 2005 Apr. 4, 2005, pp. 1-2, XP002515081, Retrieved from the Internet, URLhttp//web.archive.org/web/screenshotmaker-online-help, on Feb. 11, 2009, the whole document.
International Preliminary Report on Patentability dated May 15, 2018.
International Search Report and Written Opinion for PCT/US2016/069596 dated Mar. 28, 2017.

SYSTEMS AND METHODS FOR AUTOMATIC CONTENT VERIFICATION

BACKGROUND

It can be difficult to have mobile applications or "Apps" consistently and properly render items of content provided by a server because of the wide variety of in-App rendering environments. On the web, by contrast, there is a fairly consistent environment: most rendering occurs in one of a small number of browsers, which each have only a few versions that must be accounted for. For Apps, there is a wider variety of environmental factors, including the App itself, the client device type, the OS type, and the browser type if the item of content is to be rendered in an in-App browser window.

SUMMARY

The present disclosure is directed to systems and methods for an automatic quality control system for rendering of content within mobile applications. In one implementation, screenshots are generated after rendering an item of content, such that the screenshots correspond to an item of content as rendered in a particular environment. The screenshots are compared to a proper or "master" image of the item of content as it was supposed to be rendered using an automated system. In some implementations, content is rendered and screenshots are captured on a client device. In other implementations, content is rendered and screenshots are captured on a quality comparison server with virtual machines or environments instantiated with profiles corresponding to client devices.

A first implementation comprises requesting, from a server by an application executed by a client device, an item of content for display to a user of the client device, the request comprising environmental information related to an environment in which the item of content is to be rendered on the client device. The implementation further comprises receiving, by a network interface of the client device from the server, the requested item of content, rendering, by a renderer of the client device integrated with the application, the received item of content, capturing, by a capture module of the client device integrated with the application, an image of the rendered item of content, and transmitting, by the network interface of the client device to the server, the captured image, the server comparing the captured image to a predetermined image, the comparison identifying any rendering distortion.

A second implementation comprises receiving a request, by a server from an application executed by a client device, for an item of content for display to a user of the client device, the request comprising environmental information related to an environment in which the item of content is to be rendered on the client device, transmitting, by the server to a network interface of the client device, the requested item of content, receiving, by the server from the network interface of the client device, a captured image of a rendering of the item of content on the client device, and comparing, by a comparison engine of the a comparison module of the server, the captured image to a predetermined image, the comparison identifying any rendering distortion.

A third implementation comprises receiving, by a server from an application executed by a client device, a request for an item of content for display to a user of the device, the request comprising environmental information related to an environment in which the item of content is to be rendered on the client device, transmitting, by a network interface of the server to the client device, the requested item of content, instantiating, by a hypervisor manager of the server, a virtual machine corresponding to the environmental information, rendering, by a renderer of the virtual machine, the item of content, and capturing, by a capture engine of the virtual machine, an image of the rendered item of content.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

A computing device (e.g., a client device) can receive a resource, such as a webpage, a document, an application, an advertisement, etc. In some implementations, the computing device may access the resource via the Internet by communicating with a server, such as a webpage server, corresponding to that resource. The resource includes content from a first-party content provider and may also include additional third-party provided content, such as advertisements or other content. In one implementation, responsive to receiving a request to access a webpage, a webpage server and/or a client device can communicate with a data processing system, such as a content item selection system, to request a content item, such as an advertisement, to be presented with the requested webpage, such as through the execution of code of the resource to request a third-party content item to be presented with the resource. The content item selection system can select a third-party content item and provide data to effect presentation of the content item with the requested webpage on a display of the client device. In some instances, the content item is selected and served with a resource associated with a search query response. For example, a search engine may return search results on a search results webpage and may include third-party content items related to the search query in one or more content item slots of the search results webpage.

The computing device (e.g., a client device) may also be used to view or execute an application, such as a mobile application. The application may include first-party content that is the subject of the application from a first-party content provider and may also include additional third-party provided content, such as advertisements or other content. In one implementation, responsive to use of the application, a resource server and/or a client device can communicate with a data processing system, such as a content item selection system, to request a content item to be presented with a user interface of the application and/or otherwise. The content item selection system can select a third-party content item and provide data to effect presentation of the content item with the application on a display of the client device.

In some instances, a device identifier may be associated with the client device. The device identifier may be a randomized number associated with the client device to identify the device during subsequent requests for resources and/or content items. In some instances, the device may be configured to store and/or cause the client device to transmit information related to the client device to the content item selection system and/or resource server (e.g., values of sensor data, a web browser type, an operating system, historical resource requests, historical content item requests, etc.).

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for presentation with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other examples, a third-party content provider may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system uses content item interaction data to determine the performance of the third-party content provider's content items. For example, users may be more inclined to click on third-party content items on certain webpages over others. Accordingly, auction bids to place the third-party content items may be higher for high-performing webpages, categories of webpages, and/or other criteria, while the bids may be lower for low-performing webpages, categories of webpages, and/or other criteria.

In some instances, one or more performance metrics for the third-party content items may be determined and indications of such performance metrics may be provided to the third-party content provider via a user interface for the content item management account. For example, the performance metrics may include a cost per impression (CPI) or cost per thousand impressions (CPM), where an impression may be counted, for example, whenever a content item is selected to be served for presentation with a resource. In some instances, the performance metric may include a click-through rate (CTR), defined as the number of clicks on the content item divided by the number of impressions. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), and/or other performance metrics may be used.

In some instances, a webpage or other resource (such as, for example, an application) includes one or more content item slots in which a selected and served third-party content item may be displayed. The code (e.g., JavaScript®, HTML, etc.) defining a content item slot for a webpage or other resource may include instructions to request a third-party content item from the content item selection system to be presented with the webpage. In some implementations, the code may include an image request having a content item request URL that may include one or more parameters (e.g., /page/contentitem?devid=abc123&devnfo=A34r0). Such parameters may, in some implementations, be encoded strings such as "devid=abc123" and/or "devnfo=A34r0."

The selection of a third-party content item to be served with the resource by a content item selection system may be based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system through an auction.

During an auction for a content item slot for a resource, such as a webpage, several different types of bid values may be utilized by third-party content providers for various third-party content items. For example, an auction may include bids based on whether a user clicks on the third-party content item, whether a user performs a specific action based on the presentation of the third-party content item, whether the third-party content item is selected and served, and/or other types of bids. For example, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid and/or adjusted for other reasons. For example, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or an normalized value, may be generated to be used in the auction based on the bid value and the probability or another modifying value. In the prior example, the value or score for a bid based on whether the third-party content item is selected and served may be $0.005*1.00=0.005 and the value or score for a bid based on whether a user performs a specific action may be $5*0.002=0.01. To maximize the income generated, the content item selection system may select the third-party content item with the highest value from the auction. In the foregoing example, the content item selection system may select the content item associated with the bid based on whether the user performs the specific action due to the higher value or score associated with that bid.

Once a third-party content item is selected by the content item selection system, data to effect presentation of the third-party content item on a display of the client device may be provided to the client device using a network.

Figure 1A:
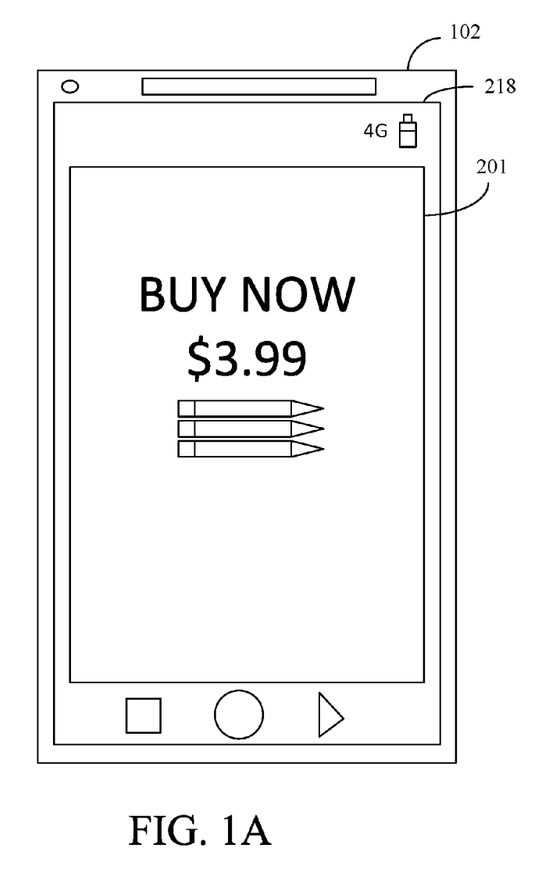
FIG. 1A is an illustration of an item of content properly rendered for display to a user of a client device, according to one implementation.

As discussed above, additional items of content such as advertisements may be displayed by client devices within applications, browsers, or other executable code. Due to the wide range of environmental variables, including device type, screen size and resolution, operating system and version, application type and version, embedded code type and version, etc., the content may not always be displayed as desired. For example, FIG. 1A depicts a properly rendered item of content being displayed by a client device. Display 218 of client device 102 is showing a proper rendering of item of content 201.

Figure 1B:
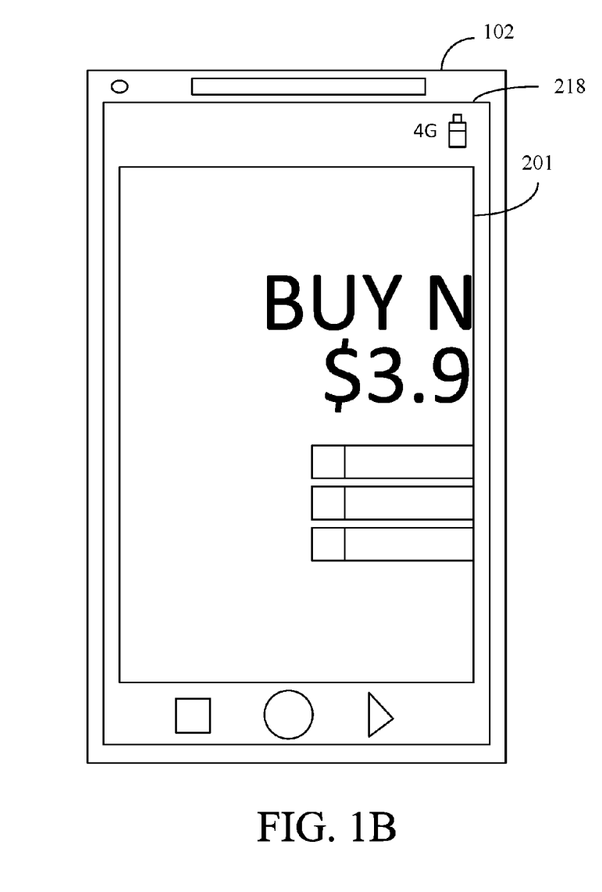
FIG. 1B is an illustration of an item of content improperly rendered for display to a user of a client device, according to another implementation.

By contrast, FIG. 1B depicts an improperly rendered item of content being displayed by the client device. In this case, display 218 of client device 102 is showing an overly zoomed-in rendering of item of content 201. Other improper renderings can include, for example, the image being shifted towards one side such that only part of the image appears on screen, or the colors of the image being incorrectly rendered, or nothing rendering at all, or any combination of these or other improper renderings. Improper renderings may result in reduced click-through or conversion rates, or may have other adverse effects. Accordingly, an automatic content verification system may be used to review rendering quality for a client device or environment, and identify proper or improper renderings. In some implementations, content providers may be charged a reduced rate or not charged for presentation of improperly rendered content.

Figure 2:
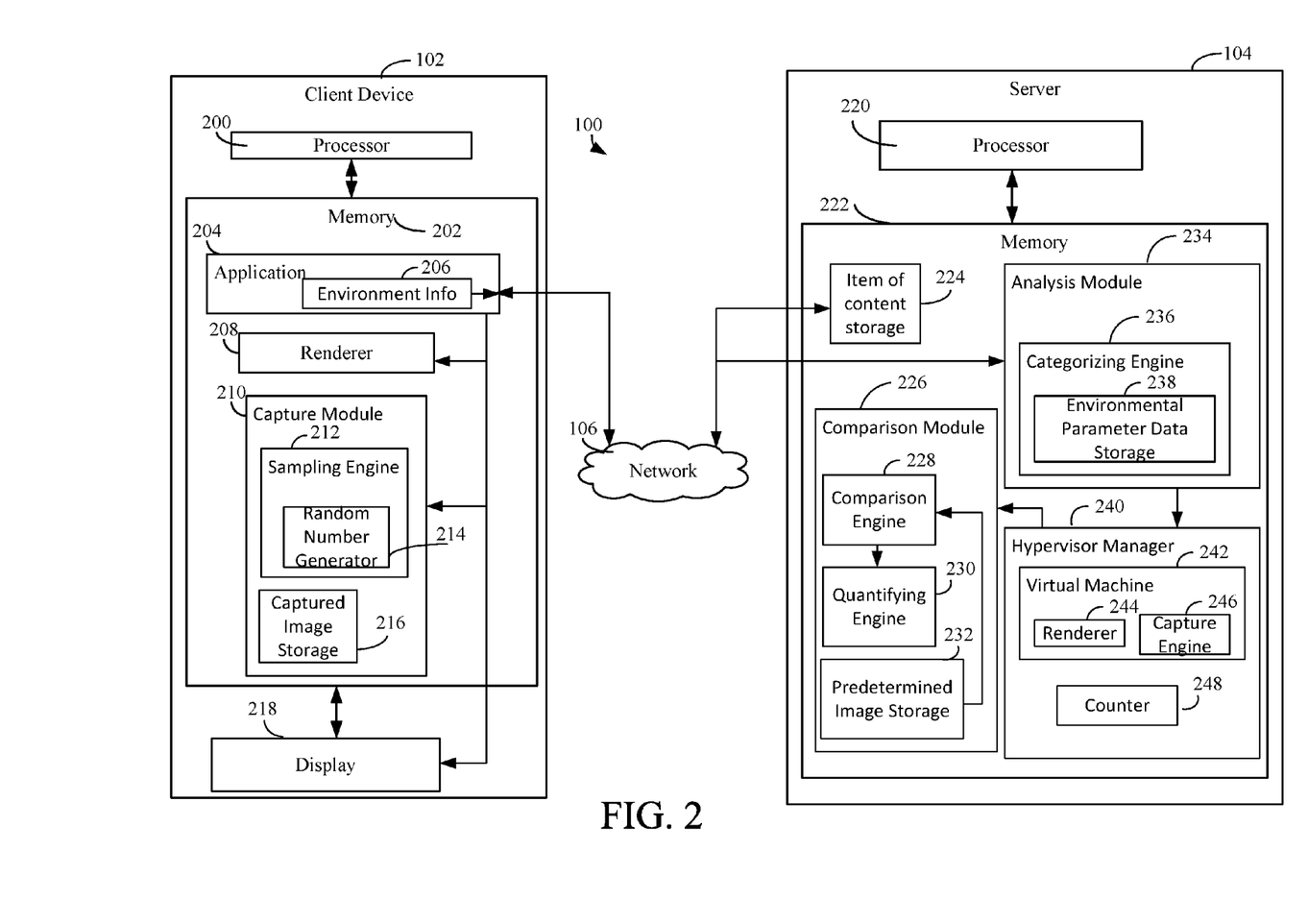
FIG. 2 is a block diagram illustrating a detailed view of components and interactions between those components in an implementation.

FIG. 2 shows some of the components, devices, and networks that can be used in a system 100 that can be used in an implementation of a method for automatic content verification. A system 100 can include a network 106. The network 106 may include a local area network (LAN), wide area network (WAN), a telephone network, such as the Public Switched Telephone Network (PSTN), a wireless link, an intranet, the Internet, or combinations thereof.

The system 100 can also include a client device 102. The client device 102 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor 200 and a memory 202. The memory 202 may store machine instructions that, when executed by a processor 200, cause the processor 200 to perform one or more of the operations described herein. The memory may also store data to effect presentation of one or more resources, content items, etc. on the computing device. The processor 200 may include a microprocessor, an application-specific integrated circuit (ASIC), a field-programmable gate array (FPGA), etc., or combinations thereof. The memory 202 may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The client device 102 can execute a software application 204 (e.g., a web browser or other application) to retrieve content from other computing devices over network 106. In some cases, an application 204 running on the client device 102 may itself be first-party content (e.g., a game, a media player, etc.). In one implementation, the client device 102 may execute a web browser application which provides a browser window on a display 218 of the client device. The browser window may be displayed over a portion of a window generated by another application, e.g. a banner or pop-up window. In such implementations, the browser may be referred to as a renderer or rendering engine for the content. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a server 104). The other device may then provide web page data and/or other data to the client device 102, which causes visual indicia to be displayed by a display 218 of the client device 102. Accordingly, the browser window displays the retrieved first-party content, such as web pages from various websites, to facilitate user interaction with the first-party content. Alternatively, in some implementations the application 204 may retrieve content from other computing devices with no input from a user. For example, in an implementation, once an application 204 is executed by a client device 102 it may retrieve content in a manner similar to the manner described above, but instead using e.g. a stored URL address rather than one inputted by a user, or may retrieve content stored locally.

The system 100 can also include at least one server, such as server 104. The server 104 can include at least one logic device, such as a computing device having a data processor, to communicate via the network 106, for example with a client device 110, and/or a third-party content server. The server 104 can include one or more data processors 220, such as a content placement processor, configured to execute instructions stored in a memory device 222 to perform one or more operations described herein. In other words, the one or more data processors and the memory device of the server 104 may form a processing module. The processor 220 may be similar to processor 200, and may include a microprocessor, an application-specific integrated circuit (ASIC), a field-programmable gate array (FPGA), etc., or combinations thereof. The memory 222 may be similar to memory 202, and may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect presentation of one or more content items to the server 104 and/or the client device 102. In addition to the processing circuit, the server 104 may include one or more databases configured to store data. The server 104 may also include an interface configured to receive data via the network 106 and to provide data from the server 104 to any of the other devices on the network 106.

One or more third-party content providers may have third-party content servers to directly or indirectly provide data for third-party content items to computing devices via network 106. The content items may be in any format that may be presented on a display of a client device 102, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers may be integrated into the server 104 and/or the data for the third-party content items may be stored in a database of the server 104.

In one implementation of a method for automatic content verification, an application 204 executed by a client device 102 of a system 100 can initiate a request for an item of content from a server 104 for display to a user via display 218 of the client device 102. This request comprises environmental information, which may be stored in the memory of the application 204, related to an environment in which the item of content is to be rendered on the client device 102. For example, the environmental information may comprise parameters of a document object model for display of the item of content, or may comprise a device type of the client device, or may comprise information related to the application 204, or may comprise an identification of a browser type of a browser window in which the item of content is to be displayed to a user, or any other information related to the environment in which the item of content is to be rendered, in any combination.

The request is transmitted via network 106 to server 104, where it can be received by a network interface of server 104. The server 104 can then transmit, via network 106, an item of content stored on the server 104 to the client device 102, where it can be received by a network interface of client device 102. Client device 102 can have a renderer 208 and a capture module 210, separate from or integrated with application 204. Renderer 208 may comprise an application, service, daemon, routine, or other executable logic for rendering a received item of content for display to a user. Renderer 208 may be part of a display engine or portion of an operating system, may be a rendering engine of an application such as a web browser, or any other such service or routine. Capture module 210 may comprise an application, service, daemon, routine, or other executable logic for capturing an image of the rendered item of content and storing the image in captured image storage 216. Capture module 210 may be part of an operating system or may be a routine that uses an application programming interface (API) of an operating system, such as triggering a screen-capture routine or saving a display buffer's contents to a memory location.

The capture module 210 can perform this capturing every time an item of content is rendered by renderer 208. In many implementations, however, such frequent capturing may be unnecessary. Accordingly, the capture module 210 can also perform this capturing when it receives an instruction to do so from server 104, the instruction being transmitted, for example, to the client device 102 along with the requested item of content via network 106. The server 104 can determine when to send this instruction. For example, the server 104 can determine to send this instruction along with every requested item of content, or it may send the instruction along with every $n^{th}$ requested item of content, or it may determine to send the instruction along with a requested item of content responsive to the output of a random number generator being equal to a predetermined value, or it may determine to send the instruction along with a requested item of content based on environmental information received from the client device 102, or it may determine to send the instruction along with a requested item of content based on any other method, or based on any combination of methods.

The capture module 210 can also perform this capturing based on a sampling engine 212 of client device 102 determining that the request for the item of content was part of a to-be-sampled group of requests. Sampling engine 212 may comprise an application, service, routine, daemon, or other executable logic for determining whether to capture rendered content. This determination may be made by the sampling engine by, for example, any of the methods described above. This determination may also be by comparing the output of a random number generator or pseudo-random number generator 214 maintained by the sampling engine 212 to a predetermined value or range of values and determining that the item of content was part of a to-be-sampled group of request if the output matches the predetermined value.

In this way, the rendering and capturing occurs on the client device 102, using the client device 102's resources. Such implementations may be referred to generally as client-side rendering or capturing implementations. In another implementation, described later, the rendering and capturing may occur on the server 104, using the server 104's resources. This may reduce processor and/or bandwidth requirements on the client device, which may be preferable to users. Such implementations may be referred to generally as server-side rendering or capturing implementations.

In the client-side rendering implementations, the capture module 210 transmits the captured image from image storage 216 to server 104 via network 106. A comparison engine 228 of comparison module 226 of the server 104 then compares the captured image to a predetermined image stored in predetermined image storage 232. This allows the comparison engine 228 to determine if the captured image corresponds to a proper rendering of the item of content and to identify any rendering distortion. Comparison engine 228 may comprise an application, daemon, routine, service, or other executable logic for comparing two images. In some implementations, comparison engine 228 may compare images on a pixel-by-pixel basis, while in other implementations, comparison engine 228 may compare images on a windowed or regional basis. Latter implementations may allow for minor transpositions or transformations of an image (e.g. shifting all pixels one position to the right) to not be considered as "improper". In one such implementation, a pixel in a first image may be compared to all pixels in a corresponding region of a second image. In another such implementation, images may be downsampled before comparison, to average out minor differences between pixels. In another implementation, images may be compared mathematically—for example, a hash or checksum may be calculated from the images and compared.

The predetermined image is an image corresponding to the captured image, such as a master image or source image. For example, the captured image may be the 100$^{th}$ rendered frame of a video item of content as rendered on the client device, or it may be an image of a banner ad item of content as rendered on the client device, or any other image of an item of content. The predetermined image would in those cases be the 100$^{th}$ rendered frame of a video item of content, or an image of a banner ad item of content, or any other image, as it is intended to be rendered by a third party provider of the item of content or as determined by the server 104. This predetermined image may, for example, be provided to the server 104 and stored in a predetermined image storage 232 of the comparison module 226 at a time when the server 104 first received the item of content from a third party. It may also, for example, be rendered by the server 104 on the server 104 from the item of content and stored in predetermined image storage 232, or may be determined and/or stored in any other way. The comparison between the captured image and the predetermined image may be done in any appropriate way, e.g. may be a pixel-by-pixel comparison, or a hash comparison, or any other appropriate comparison.

A quantifying engine 230 may comprise an application, service, daemon, routine, or other executable logic for computing a distortion value of a rendered image or otherwise quantifying rendering distortion. A quantifying engine 230 of comparison module 226 may compute a distortion value based at least in part on any identified rendering distortion. For example, if the comparison engine 228 performs a pixel-by-pixel comparison and identifies that seventy percent of the pixels of the captured image exhibit a rendering distortion (i.e. are not the same as the corresponding pixels of the predetermined image), then the quantifying engine 230 may compute a distortion value of 70. Alternatively, the computed distortion value may be a binary value (a 1 or a 0) that indicates whether any rendering distortion was identified. The computation of the distortion value may also be performed in any other appropriate manner.

Some implementations may further comprise performing analysis on a set of data comprising distortion values and environmental information. The server 104 may store a distortion value and corresponding environmental information related to the environment in which the corresponding captured image was rendered. A categorizing engine 236 of an analysis module 234 of the server 104, which may comprise an application, service, daemon, routine, or other executable logic, may analyze the environmental information and thereby determine at least one value for at least one of a plurality of environmental parameters. For example, a plurality of environmental parameters may include three environmental parameters: a device-type parameter, a browser-type parameter, and an application-type parameter. Different values for those parameters may be assigned to mean different things. For example, a 1 for device-type may mean that the item of content was rendered on an LG G4 mobile phone, a 2 for device-type may mean that the item of content was rendered on an iPhone 6, and so on. A 1 for browser-type may mean that the item of content was rendered in a Chrome browser window, a 2 for browser-type may mean that the item of content was rendered in a Safari browser window, and so on. A 1 for application-type may mean that the item of content was rendered by a renderer integrated with a game application, a 2 for application-type may mean that the item of content was rendered by a renderer integrated with a shopping application, and so on. The values determined by the categorizing engine 236 of the analysis module 234 may then be stored in environmental parameter data storage 238 of the categorizing engine.

An analysis module 234 may comprise an application, service, daemon, routine, or other executable logic for identifying a correlation between a distortion value being above a predetermined threshold and a value for a corresponding environmental parameter. This allows the analysis module 234 to generate a report identifying the value of the environmental parameter as associated with improperly rendered content. For example, a predetermined threshold may be 10. This may be determined by, for example, a third party provider of the item of content, or by the server 104. The analysis module 234 may then, for example, determine the percent chance of a distortion value being above the predetermined threshold given a particular value for a corresponding environmental parameter. For example, the analysis module 234 may analyze three distortion values of 8, 12 and 15 with corresponding values of 1 for a device-type environmental parameter (e.g. three distortion values for rendering performed on an iPhone 6). The analysis module 234 may, from this analysis, calculate that there is a 33 percent chance of improper rendering of the corresponding item of content on an iPhone 6. Based on, e.g., comparison of this percentage with another predetermined threshold of e.g. 5 percent, determined by, e.g., a third party provider of the item of content, or by the server 104, the environmental parameter of value 1 (e.g. the device being an iPhone 6) may be associated with improperly rendered content. The above describes only one possible process of analysis. Many other processes are possible, and generally any applicable analysis may be performed.

In some implementations, analysis may be performed to determine whether there is a correlation (and/or how strong a correlation exists) between rendering distortions and the combination of an environment in which an item of content is to be rendered and features of the item of content to be rendered. Features of the item of content to be rendered may include media type (e.g. video, audio, image, text, hyperlink, any other media type, or any combination thereof), file type (e.g. .avi, .mov, .wav, .jpg, or any other file type), font size or style or format for textual items of content and/or items of content that include text, any other features that may pertain to an item of content, or any combination of thereof. Features of items of content may include metadata related to the item of content. Any property of an item of content, including any property of the content of the item of content or of the format or file type or data structure of the item of content, or any combination of properties of an item of content, may be a feature of an item of content.

Analysis may be performed to determine whether any combination of an environment and a feature of an item of content to be rendered are correlated with a rendering distortion. For example, analysis may determine that video content being rendered on an iPhone 6 mobile device (possibly with a certain operating system and/or software installed) is strongly correlated with rendering distortions, or that text content with font size greater than 12 rendered on a Galaxy S Mini mobile device is strongly correlated with rendering distortion, or that audio content on an LG G4 mobile device is not correlated or weakly correlated with rendering distortions. Any combination of environment and features of an item of content to be rendered may be so analyzed. Such analysis may be based upon environmental information, as described above, and upon item of content information related to features of an item of content to be rendered, or may be based on any other appropriate information. Analysis of combinations of environmental information and item of content information may be done on a data set that includes a set of values for environmental parameters, such as those described above and established in e.g. the manner described above and further includes a set of values for item of content parameters, or in any other appropriate manner. Item of content parameters may be established in a manner similar to that used to establish environmental parameters, described above. For example, a plurality of item of content parameters may include three item of content parameters: a file-type parameter, a file-size parameter, and a text-size parameter. Different values for those parameters may be assigned to mean different things. For example, a 1 for file-type may mean that the item of content is a .txt file, a 2 for file-type may mean that the item of content is a .docx file, and so on. The values for item of content parameters may be determined by the categorizing engine 236 of the analysis module 234, similarly to how the environmental parameters may be established as described above.

Analysis may be performed, and reports may be generated on the results of the analysis, to determine whether there exists a correlation (and possibly how strong the correlation is) between the combination of a certain value of an environmental parameter or a set of certain values for a plurality of environmental parameters and a certain value of an item of content parameter or a set of certain values for a plurality of item of content parameters and rendering distortions or distortion values, which may be created in the manner described above. The analysis and the generation of reports may be done in any appropriate manner. For example, a report may be generated that indicates that rendering distortion (e.g. a rendering distortion value being above a predetermined threshold) was observed in 33% of the cases in which a video item of content was to be rendered on an iPhone 6 mobile device. Analysis may be performed to any level of granularity. For example, analysis may be performed that indicates that rendering was observed in 33% of the cases in which a video item of content was to be rendered on an iPhone 6 mobile device, but that rendering distortions only occurred in the cases in which the item of content to be rendered included audio. This analysis, and/or reports generated by the analysis, may be useful for establishing patterns that indicate problematic combinations of environments and features of items of content to be rendered.

In another implementation of a method of automatic content verification, items of content are rendered and images are captured on a server 104, rather than on a client device 102 as described above. In such implementations, a server 104 receives a request from an application executed by a client device for an item of content for display to a user of the device. The request comprises environmental information similar to that described above. The server 104 transmits the requested item of content to the client device 102 from e.g. a network interface of the server via network 106.

Server 104 may instantiate and/or maintain one or more virtual machines via a hypervisor. In one such implementation, a hypervisor manager 240 of the server 104 may instantiate a virtual machine 242 corresponding to the environmental information. In this way, an environment corresponding to the environment in which the item of content is to be rendered is generated. A renderer 244 of the virtual machine 242, similar to renderer 208, can then render the item of content, and a capture engine 246 of the virtual machine 242, similar to capture module 210, can then capture an image of the rendered item of content.

Figure 5:
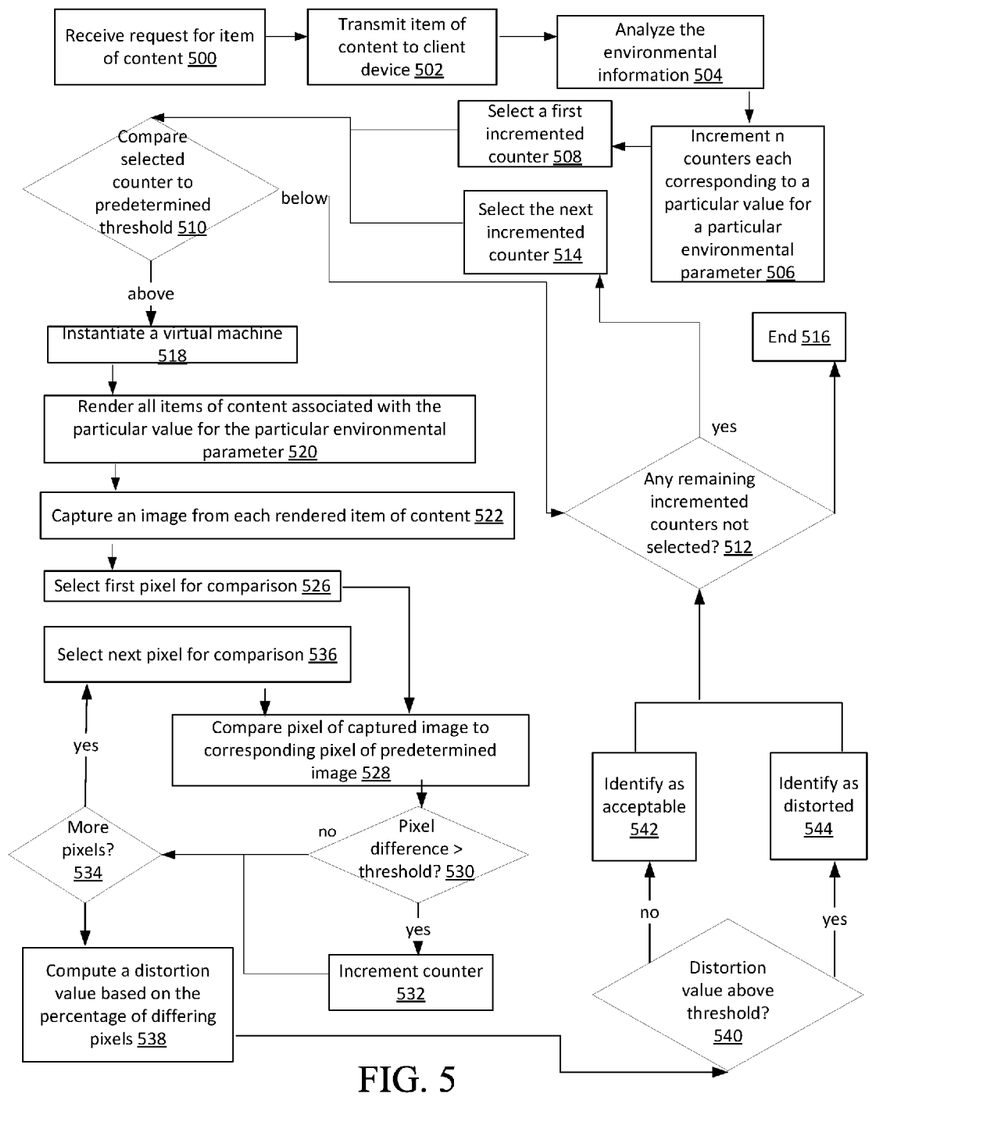
FIG. 5 is a flow chart illustrating instantiation of virtual machine environments for server-side rendering, according to one implementation.

The hypervisor manager 240 need not instantiate a virtual machine to render and capture as described immediately after the item of content is transmitted to the client device 102. The hypervisor manager can, for example, wait until a plurality of items of content are transmitted to similar or identical environments, and only then instantiate a virtual machine to perform rendering and capturing on some or all such items of content. The some or all such content items may be selected by methods similar to those described above involving a sampling engine, or by any other appropriate method. An example of this process is described in further detail below and is shown in FIG. 5. The advantage of this waiting is that the server need not instantiate a new virtual machine for each item of content to be rendered, which occupies server resources such as server memory; rather, it only instantiates a virtual machine a single time in order to render a plurality of items of content.

After the hypervisor manager renders the item of content and captures an image, as described above, the process may continue in any of the ways described above with reference to the process shown in FIG. 2, e.g. by comparing the captured image to a predetermined image, by determining a distortion value, and/or by analyzing the distortion value vis-à-vis the corresponding environmental information, etc., or by any other manner.

Figure 3:
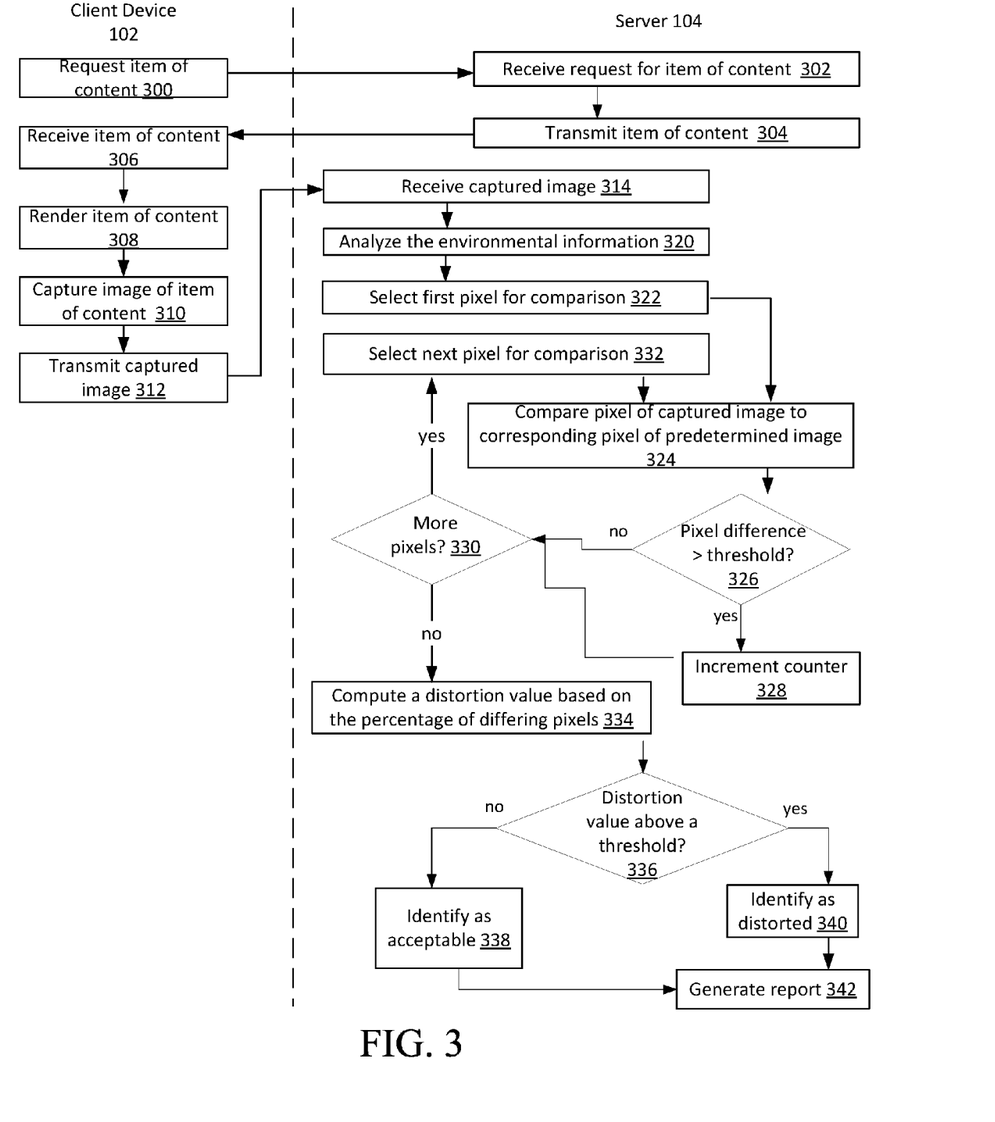
FIG. 3 is a flow chart illustrating a client-side rendering method for automated quality control, according to one implementation.

FIG. 3 shows an implementation similar to one described above in which the client device renders an item of content and captures an image. In one such implementation, an application 204 of a client device 102 requests an item of content from a server 104 at step 300. The request may include environmental information, as described above. The request may be transmitted via any appropriate method, such as an HTTP GET request, a remote procedure call, or any other such method. In some implementations, transmitting the request may comprise opening a transport layer connection to the server.

The server 104 may receive the request for an item of content at step 302. As noted above, the request may be received as an HTTP GET request, a remote procedure call, or any other type and form of request. The request may be received over an established transport layer connection, or a new connection may be opened for or with the request.

At step 304, in some implementations, the server may transmit the item of content to the client device 102. The item of content may be transmitted via the established transport layer connection or via a new connection. In some implementations, the server may transmit a second request to a second server (not illustrated), which may provide the item of content either directly to the client device 102 or to server 104 for forwarding to the client device. In other implementations, the server may respond with an address or URL of an item of content, and the client may separately request the content at the identified address or URL (e.g. at a content storage server). In some implementations, the server may determine or select an item of content for presentation to the client based on, for example, user information, device information, application information, geographic location, time of day, day of week, or any other type and form of information.

The client device 102 may receive the item of content at step 306 in some implementations. Receiving the item of content may involve receiving the item of information as a data packet through a connection as described above, or in any other manner, and storing it on the client. It may also involve storing the item of information on a device external to the client but accessible by the client, or may involve storing the item of content in any other manner. Receiving the item of content may also involve receiving an address or URL of an item of content, as described above, or in any other manner, and storing that address or URL on the client, or on a device or second server external to the client but accessible by the client, either directly or indirectly, or storing the address or URL in any other manner.

In some implementations, at step 308, a renderer 208 of the client device 102 may render the item of content. The rendering of the item of content may involve displaying video corresponding to the item of information on a display of the client device. The rendering might additionally or alternatively involve displaying video on a display external to the client device such as, for example, a monitor connected to the client device by USB, by A/V jacks, by HDMI, by a wireless internet connection, by a wired Ethernet connection, or by any other connection. Additionally or alternatively, the rendering may involve a single image file or string of image files corresponding to a video item of content being produced from the item of content At step 310, in some implementations, a capture module 210 of the client device 102, which may, for example, be part of an operating system or may be a routine that uses an application programming interface (API) of an operating system, such as triggering a screen-capture routine or saving a display buffer's contents to a memory location, captures an image of the item of content. The capturing an image may involve taking a screenshot of a display that is displaying the rendered item of content and storing the screenshot. Additionally or alternatively, the capturing may involve selecting one image from a string of rendered images in sequence and storing said image. The captured image may be stored as a jpeg file, a png file, a bitmap image, or any other image file. The captured image may also be stored as an HTML page, or in any other fashion. As discussed above, the capture module 210 can perform this capturing every time an item of content is rendered by renderer 208. In many implementations, however, such frequent capturing may be unnecessary. Accordingly, the capture module 210 can also perform this capturing when it receives an instruction to do so from server 104, the instruction being transmitted, for example, to the client device 102 along with the requested item of content via network 106. The server 104 can determine when to send this instruction. For example, the server 104 can determine to send this instruction along with every requested item of content, or it may send the instruction along with every $n^{th}$ requested item of content, or it may determine to send the instruction along with a requested item of content responsive to the output of a random number generator being equal to a predetermined value, or it may determine to send the instruction along with a requested item of content based on environmental information received from the client device 102, or it may determine to send the instruction along with a requested item of content based on any other method, or based on any combination of methods. The capture module 210 can also perform this capturing based on a sampling engine 212 of client device 102 determining that the request for the item of content was part of a to-be-sampled group of requests. Sampling engine 212 may comprise an application, service, routine, daemon, or other executable logic for determining whether to capture rendered content. This determination may be made by the sampling engine by, for example, any of the methods described above. This determination may also be by comparing the output of a random number generator or pseudo-random number generator 214 maintained by the sampling engine 212 to a predetermined value or range of values and determining that the item of content was part of a to-be-sampled group of request if the output matches the predetermined value.

The client device 102 may then transmit the captured image to server 104 at step 312, in some implementations. In some implementations, the item of content may be transmitted via an established transport layer connection or via a new connection. In some implementations, the client device 102 may transmit a second request to a second server (not illustrated), which may provide the item of content either directly or indirectly to the server 104. In other implementations, the client device may transmit an address or URL of a captured image.

In some implementations, at step 314, the server 104 receives the captured image. Receiving the captured image may involve receiving the captured image as a data packet through a connection as described above, or in any other manner, and storing it on the server. It may also involve storing the captured image on a device or on a second server external to the server 104 but accessible by the server 104, or may involve storing the captured image in any other manner. Receiving the captured image may also involve receiving an address or URL of the captured image, as described above, or in any other manner, and storing that address or URL on the server 104, or on a device or second server external to the server 104 but accessible, either directly or indirectly, by the server 104, or storing the address or URL in any other manner.

In some implementations, at step 320, an analysis module 234 of the server 104, which may comprise an application, service, daemon, routine, or other executable logic, analyses the environmental information associated with the captured image as described above. This may involve determining at least one value for at least one of a plurality of environmental parameters, based on environmental information associated with the captured image. The environmental information associated with the captured image may have been previously transmitted with the request for an item of content by the client device 102 from the server 104. This environmental information may have been transmitted in the manner described above as part of the request for the item of content, or in any other manner. The environmental information may additionally or alternatively have been transmitted separately from the request for an item of content by the client device 102 to the server 104, in any manner, either directly or indirectly. For example, the environmental information may have been transmitted via a newly opened connection between the client device 102 and the server 104 after the request for the item of content was transmitted by the client device but before the client device received the item of content, or may have been transmitted via a newly opened connection between the client device 102 and the server 104 after the item of content was received by the client device 102, or the environmental information may have been sent along with the transmission of the captured image from the client device 102 to the server 104, or in any other fashion, at any other time. The environmental information may be associated with a particular captured image in any manner that allows the server 104 to determine at a later point in time that the environmental information is related to the particular captured image. In one implementation, when the server 104 receives a request for an item of an item of content from the client device 102, the request may comprise environmental information, as discussed above. The environmental information may then be stored on the server 104 in any manner, such as, for example, in the server's memory or on the memory of a device or other server accessible by the server 104. The item of content that may then be transmitted in step 304 in response to the request along with an identifier denoting which environmental information is associated with that requested item of content. The client device 102 may then include that identifier when it transmits the captured image to the server 104 at step 312, thus associating the captured image with particular environmental information. A captured image may additionally or alternatively be associated with particular environmental information in any other fashion that associates environmental information related to the environment in which the image was captured with the captured image.

As discussed above, in some implementations, at step 320, an analysis module 234 of the server 104, which may comprise an application, service, daemon, routine, or other executable logic, analyses the environmental information associated with the captured image as described above. This may involve determining at least one value for at least one of a plurality of environmental parameters, based on environmental information associated with the captured image. In some implementations, this determination is made by a categorizing engine 236 of the analysis module 234. A plurality of environmental parameters may include any number of environmental parameters. These parameters may be, for example, a device-type parameter, an operating-system-type parameter, an operating-system-version parameter, a browser-type parameter, a browser-version parameter, an application-type parameter, or any other parameter that may describe an environment in which the item of content was rendered. Different values for those parameters may be assigned to mean different things. For example, a 1 for device-type may mean that the item of content was rendered on an LG G4 mobile phone, a 2 for device-type may mean that the item of content was rendered on an iPhone 6, and so on. A 1 for browser-type may mean that the item of content was rendered in a Chrome browser window, a 2 for browser-type may mean that the item of content was rendered in a Safari browser window, and so on. A 1 for application-type may mean that the item of content was rendered by a renderer integrated with a game application, a 2 for application-type may mean that the item of content was rendered by a renderer integrated with a shopping application, and so on. The values determined by the categorizing engine 236 of the analysis module 234 may, in some implementations, then be stored in an environmental parameter data storage 238 of the categorizing engine. Item of content information may also be similarly parametrized. Although FIG. 3 does not depict item of content information being parametrized in the manner just described for environmental information, item of content information may be parametrized in this same manner, or in any other appropriate manner, as described above.

In some implementations, a comparison module 226 of the server 104 compares the captured image to a predetermined image in steps 322 through 332. The predetermined image may, for example, be predetermined as described above. The comparison may be a pixel-by-pixel comparison of the captured image to a predetermined image stored in a predetermined image storage 232. As noted above, other methods of comparison are possible, including e.g. a hash comparison. In implementations involving a pixel-by-pixel comparison, the pixels may each have a greyscale intensity value. For example, the pixels may correspond to a greyscale image, and the pixels within that image vary by position and by greyscale intensity, such as, for example, an intensity value in a range of 0-255, where 0 may represent black and 255 may represent white, with the intervening values representing a spectrum of grey color. A greyscale intensity value may also be assigned using any other scale. In other implementations, a pixel-by-pixel comparison compares colored pixels. For example, each pixel may have values assigned to certain color channels. A pixel can have any number of color channels, and the color channels can represent any colors. For example, a pixel may have red, green and blue color channels, or may have cyan, magenta, yellow, and black color channels, or any other color channels. Similar to the greyscale spectrum described above, a pixel may have an intensity value assigned to a color channel along a spectrum corresponding to that color channel. For example, a pixel may have a value of 0 intensity for a red color channel, 128 intensity for a blue color channel, and 0 for a green color channel, producing a pixel that is displayed as navy blue. A pixel may have any other combination of color channel intensity values. In implementations in which a pixel-by-pixel comparison is performed, the captured image and the predetermined image may have the same number of pixels. They may also have a different number of pixels. In some implementations in which the images have a different number of pixels, the number of pixels being compared may be made equal for purposes of the comparison by, for example, ignoring some pixels of the image having a larger number of pixels. Additionally or alternatively, some pixels of the image having a larger number of pixels may be merged by e.g. taking the average of the color channel intensity numbers for two pixels being merged to create a single pixel and repeating this process until the number of pixels being compared are equal.

In some implementations, at step 322, a first pixel is selected for comparison. This may be any pixel of either the captured image or the predetermined image. For example, the captured image may comprise a rectangular grid of pixels, and the pixel in the first row, first column of the captured image may be selected.

In some implementations, at step 324, a corresponding pixel of the other image may then be selected, e.g. a pixel in the first row, first column of the predetermined image, and compared to the pixel selected in step 322, e.g. a pixel in the first row, first column of the captured image. This comparison may, for example, compare the respective intensities in the color channels of the pixels. For example a red intensity of the captured image pixel may be compared to a red intensity of the predetermined image pixel, a green intensity of the captured image pixel may be compared to a green intensity of the predetermined image pixel, and a blue intensity of the captured image pixel may be compared to a blue intensity of the predetermined image pixel. Differences between the respective intensities may be stored in the memory of the comparison module 226. The differences may be stored as the respective differences between each color channel intensity. For example, if one pixel has a color channel distribution of, e.g., red: 200, green: 180, blue 170, and the other pixel has a color channel distribution of red: 210, green: 180, blue 175, the differences may be stored as red: 10, green: 0, blue: 5. These stored differences may also indicate if the intensity is higher in the captured image pixel or in the predetermined image pixel. For example, if the captured image pixel has red: 150, and the predetermined image pixel has red: 160, this could be indicated by a difference of +10, where the plus sign indicated that the captured image has a higher intensity than the predetermined image. Any other standard with regard to the positivity or negativity of differences representing which pixel has a higher or lower intensity can also be established.

In some implementations, at step 326, the difference between the pixels is compared to a threshold. For example, a "total difference" may be determined by having, e.g., the comparison module 22 add the individual color channel stored differences. If, for example, the individual color channel stored differences are red: 10, green: 0, blue: −5, a total difference could be the sum of the absolute values of these difference, i.e. 15. In some implementations, this total difference is compared to a threshold in step 326. For example, if the threshold is set at 5, and a total difference is calculated to be 15, then the difference between the pixels would be above a threshold. If the difference is found to be above a threshold, the method may proceed to step 328, where a counter is incremented. This counter can keep count of how many pixels are unacceptably different from their corresponding pixels, between the two images. After the counter is incremented, the method may proceed to step 330. If, back at step 326, the difference is not found to be above a threshold, the method may proceed directly to step 330.

In some implementations, at step 330, the comparison module 226 determines if there are any corresponding pixels in the images that have not been compared. If there are still pixels remaining that should be compared, the method may proceed to step 332, where a new pair of corresponding pixels are selected for comparison. If all corresponding pixels have been compared, the method may proceed to step 334.

In some implementations, at step 334, quantifying engine 230 of the server 104, which may comprise an application, service, daemon, routine, or other executable logic, may compute a distortion value based on a counted number of differing pixels. The counted number of differing pixels may be determined by reference to the counter discussed above in the description of step 328. The distortion value may be any value that can represent how many corresponding pixels differ from each other significantly, e.g. by an amount above a threshold as discussed above. For example, the distortion value may be the total percentage of corresponding pixels that differ from each other significantly. For example, if 256 pixels were compared, and 64 of them were found to differ from each other significantly, the distortion value may be calculated to be 25, corresponding to the 25% of pixels that differed significantly. The distortion value may additionally or alternatively be any other value that can represent how many corresponding pixels differ from each other significantly.

In some implementations, at step 336, a quantifying engine 230 may compare the distortion value to a threshold. If the distortion value is found to be above the threshold, the method may proceed to step 340, where the captured image is identified as distorted, and then to step 342, where a report is generated that notes this distortion. If, at step 336, the distortion value is not found to be above a threshold, the method may proceed to step 338, where the captured image is identified as acceptable, and then to step 342 where a report is generated that notes this acceptability. The reports may be, for example, a binary notation in a spreadsheet wherein a 1 indicates distortion and a 0 indicates acceptability, or may be any other record of the distortion or acceptability. The report may alternatively or additionally associate environmental parameters corresponding to the captured image with improper rending. This allows a server manager or someone in contact with the server or server manager, e.g. an item of content provider, to know that there is a rendering issue when the item of content is rendered in the corresponding environment. The report may also indicate whether combinations of environments and features of an item of content to be rendered are associated with improper rendering, as described above.

Figure 4:
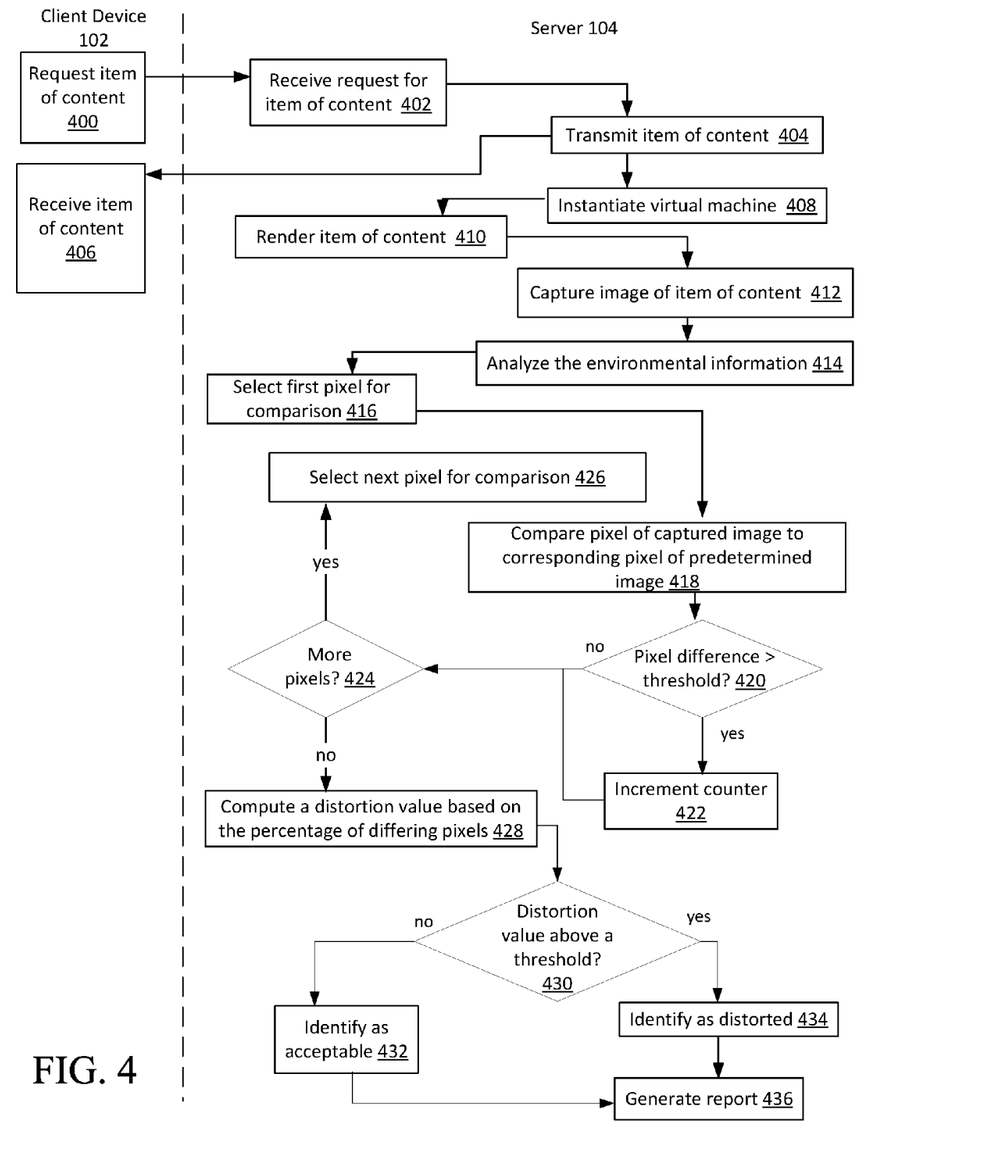
FIG. 4 is a flow chart illustrating a server-side rendering method for automated quality control, according to one implementation.

FIG. 4 shows implementations similar to one described above in which the server renders an item of content and captures an image. FIG. 4 makes clear whether the client device 102 or the server 104 performs the processes described. In one implementation, an application 204 of a client device 102 requests an item of content at 400. A server 104 receives the request at 402 and transmits the item of content to the client device 102 at 404. The item of content is received by the client device at 406. These steps are similar to steps 300-306 of FIG. 3.

In one implementation, at step 408 a hypervisor manager 240 can instantiate a virtual machine 242. It is also possible for the hypervisor manager 240 to wait to instantiate a virtual machine, e.g. as described below with reference to FIG. 5. The hypervisor manager 240 may comprise an application, service, daemon, routine, or other executable logic needed to instantiate a virtual machine. A virtual machine 242 may be an emulation of a particular computer system, e.g., a computer system corresponding to the environmental information related to the environment in which the item is to be rendered on the client device 104. It may be a system virtual machine, a process virtual machine, or other virtual machine. It may utilize a native execution virtualization technique or any other appropriate virtualization technique.

In one implementation, at step 410, the virtual machine renders the item of content. The rendering of the item of content may involve displaying video corresponding to the item of information on a display, or may involve displaying a single image that corresponds to the item of content. Additionally or alternatively, the rendering may involve a single image file or string of image files corresponding to a video item of content being produced from the item of content. These files may be produced by the virtual machine using an emulated environment based on the environmental information discussed above. For example, the virtual machine may open a particular version of a particular browser type window in a particular operating system. This is meant to mimic the environment in which the item of content is to be rendered and can help determine if there would be any rendering distortions in that environment.

In one implementation, at step 412, a capture engine 246 of the virtual machine captures an image of the item of content. The capturing an image may involve taking a screenshot of a display that is displaying the rendered item of content and storing the screenshot. Additionally or alternatively, the capturing may involve selecting one image from a string of rendered images in sequence and storing said image. The captured image may be stored as a jpeg file, a png file, a bitmap image, or any other image file. The captured image may also be stored as an HTML page, or in any other fashion.

In one implementation, at step 414, an analysis module 234 of the server 104 analyses the environmental information associated with the captured image. This analysis may be similar to that done by server 104 in step 320 of FIG. 3. This step, and the remaining steps 416-436, may be performed in manner similar to that described above for steps 320-342 of FIG. 3, or in any other appropriate manner.

FIG. 5 shows a decision making process of implementations in which the server 104 instantiates a virtual machine corresponding to a particular environment to render items of content in order to capture an image. In these implementations, the server only instantiates the virtual machine when there is a significant number of items of content with similar environmental parameters to be rendered, thereby conserving server resources when compared to newly instantiating a virtual machine each time an item of content is to be rendered.

In one implementation, at step 500, a server 104 receives a request for an item of content from a client device 102. The request includes environmental information. This step may be performed in a manner similar to that described in step 302 of FIG. 3. In one implementation, at step 502, the server 104 transmits the item of content to the client device. This step may be performed in a manner similar to that described in step 304 of FIG. 3. In one implementation, at step 504, the analysis module 234 of server 104 analyzes the environmental information, thereby determining a value for at least one of a plurality of environmental parameters. This step may be performed in a manner similar to that described in step 320 of FIG. 3

In one implementation, at step 506, the hypervisor manager 240 of the server 104 increments n counters 248, each of the n counters corresponding to a particular value for a particular environmental parameter. For example, one counter can correspond to a value of 1 for device-type (e.g. an iPhone 6), a second counter can correspond to a 2 for device-type (e.g. an LG G4 mobile device), a third counter can correspond to a value of 1 for application-type (e.g. a game application), and so on.

In one implementation, at step 508, the hypervisor manager 240 will select a first incremented counter 240. At step 510, the hypervisor manager 240 may compare the number counted by the selected counter to a predetermined threshold or number. For example, this number may be 5 if it is desired to only instantiate a virtual machine corresponding to a particular environment when there are at least 5 items of content to be rendered on that virtual machine. The predetermined number may be provided, for example, by the server 104. If the number is below the predetermined threshold, the method may proceed to step 512. If the number is above or equal to the predetermined threshold, the method may proceed to step 518.

In one implementation, at step 512, the hypervisor manager 240 determines if there are any remaining incremented counters that have not been selected. If there are, then the method may proceed to step 514 where the hypervisor manager 240 selects the next incremented counter and proceeds back to 510. If there are not, the hypervisor manager 240 proceeds to step 516 and the process ends.

Going back to step 510, if the number counted by the selected counter is above the predetermined threshold, then the hypervisor manager 240 proceeds to step 518 and instantiates a virtual machine corresponding to the environment information corresponding to the particular value for the particular environmental parameter. For example, the hypervisor manager 240 may instantiate a virtual machine corresponding to an iPhone 6 environment.

In one implementation, at step 520 a renderer 244 of virtual machine 242 may render all items of content associated with the particular value for the particular environmental parameter, e.g. all items of content to be rendered on an iPhone 6. The renderer may comprise an application, service, daemon, routine, or other executable logic for rendering a received item of content for display to a user. All items of content may be rendered one after the other, or all at once, or in any other manner. Alternatively, the hypervisor manager may render fewer than all items of content associated with the particular value for the particular environmental parameter at this point. This would allow the server 104 to conserve resources, at the cost of having a smaller sample of rendered items of content.

In one implementation, at step 522 a capture engine 246 of virtual machine 242 may capture an image from each rendered item of content. This capturing may be similar to that done by capture engine 246 in step 412 of FIG. 3, or may be done in any other appropriate manner.

In one implementation, the remaining steps 524-544, may be performed in a manner similar to that described above for steps 320-342 of FIG. 3, or in any other appropriate manner. At steps 542 and 544, the method may proceed back to step 512, and proceed from there in the manner described above.

Although an implementation of a system 100 has been described above, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for automatic content verification, comprising:
   requesting, from a server by an application executed by a client device, an item of content for display to a user of the client device, the request comprising environmental information related to an environment in which the item of content is to be rendered on the client device;
   receiving, by a network interface of the client device from the server, the requested item of content;
   rendering, by a renderer of the client device integrated with the application, the received item of content;
   capturing, by a capture module of the client device integrated with the application, an image of the rendered item of content;
   transmitting, by the network interface of the client device to the server, the captured image, the server comparing the captured image to a predetermined image, the comparison identifying any rendering distortion.

2. The method of claim 1, wherein requesting an item of content for display further comprises transmitting the request comprising parameters of a document object model for display of the item of content.

3. The method of claim 1, wherein requesting an item of content for display further comprises transmitting the request comprising a device type of the client device.

4. The method of claim 1, further comprising displaying, by the client device in a browser window, the item of content to the user of the client device; and wherein the request further comprises an identification of a browser type of the browser window.

5. The method of claim 1, wherein capturing an image of the rendered item of content further comprises determining, by a sampling engine of the capture module, whether the request is part of a to-be-sampled group of requests, and capturing the image of the rendered item of content responsive to the request being part of the to-be-sampled group of requests.

6. The method claim of claim 5, wherein determining whether a request is part of a to-be-sampled group of requests further comprises comparing an output of a random number generator to a predetermined value, and determining whether a request is part of a to-be-sampled group of requests responsive to the output matching the predetermined value.

7. The method of claim 1, further comprising receiving a request, by the client device from the server, to capture the image of the rendered item of content.

8. A method for automatic content verification, comprising:
receiving a request, by a server from an application executed by a client device, for an item of content for display to a user of the client device, the request comprising environmental information related to an environment in which the item of content is to be rendered on the client device;
transmitting, by the server to a network interface of the client device, the requested item of content;
receiving, by the server from the network interface of the client device, a captured image of a rendering of the item of content on the client device;
comparing, by a comparison engine of the a comparison module of the server, the captured image to a predetermined image, the comparison identifying any rendering distortion.

9. The method of claim 8, further comprising computing, by a quantifying engine of the comparison module, a distortion value based at least in part on the any identified rendering distortion.

10. The method of claim 8, wherein the comparison is a pixel-by-pixel comparison between corresponding pixels of the captured image and the predetermined image.

11. The method of claim 8, wherein the comparison is a hash comparison.

12. The method of claim 9, further comprising:
storing, on the server, the distortion value and the corresponding environmental information; and
analyzing, by a categorizing engine of an analysis module of the server, the environmental information, thereby determining a value for at least one of a plurality of environmental parameters; and
storing the value for at least one of a plurality of environmental parameters on the server.

13. The method of claim 12, further comprising identifying, by the analysis module of the server, a correlation between a distortion value being above a predetermined threshold and a value for a corresponding environmental parameter; and generating a report, by the analysis module of the server, identifying the value of the environment parameter as associated with improperly rendered content.

14. The method of claim 9, further comprising:
storing, on the server, the distortion value, the corresponding environmental information, and corresponding item of content information related to features of the item of content;
analyzing, by a categorizing engine of an analysis module of the server, the environmental information, thereby determining a value for at least one of a plurality of environmental parameters;
analyzing, by a categorizing engine of an analysis module of the server, the item of content information, thereby determining a value for at least one of a plurality of item of content parameters;
identifying, by the analysis module of the server, a correlation between a distortion value being above a predetermined threshold and a combination of a value of a corresponding environmental parameter and a value of a corresponding item of content parameter; and
generating a report, by the analysis module of the server, identifying the combination of the value of the environmental parameter and the value of the item of content parameter as associated with improperly rendered content.

15. A method for automatic content verification, comprising:
receiving, by a server from an application executed by a client device, a request for an item of content for display to a user of the device, the request comprising environmental information related to an environment in which the item of content is to be rendered on the client device;
transmitting, by a network interface of the server to the client device, the requested item of content;
instantiating, by a hypervisor manager of the server, a virtual machine corresponding to the environmental information;
rendering, by a renderer of the virtual machine, the item of content; and
capturing, by a capture engine of the virtual machine, an image of the rendered item of content.

16. The method of claim 15, further comprising:
comparing, by a comparison engine of a comparison module of the server, the captured image to a corresponding predetermined image to identify differences between the captured image and the corresponding predetermined image; and
computing, by a quantifying engine of the comparison module, a distortion value based on the identified differences.

17. The method of claim 16, further comprising:
storing, on the server, the distortion value and the corresponding environmental information; and
analyzing, by a categorizing engine of an analysis module of the server, the environmental information, thereby determining a value for at least one of a plurality of environmental parameters; and
storing the value for at least one of a plurality of environmental parameters on the server.

18. The method of claim 17, further comprising:
identifying, by the analysis module of the server, a correlation between a distortion value being above a predetermined threshold and a value for a corresponding environmental parameter; and generating a report, by the analysis module of the server, identifying the value of the environment parameter as associated with improperly rendered content.

19. The method of claim 16, further comprising:
storing, on the server, the distortion value, the corresponding environmental information, and corresponding item of content information related to features of the corresponding item of content;
analyzing, by a categorizing engine of an analysis module of the server, the environmental information, thereby determining a value for at least one of a plurality of environmental parameters;
analyzing, by a categorizing engine of an analysis module of the server, the item of content information, thereby determining a value for at least one of a plurality of item of content parameters;
identifying, by the analysis module of the server, a correlation between a distortion value being above a predetermined threshold and a combination of a value of a corresponding environmental parameter and a value of a corresponding item of content parameter; and
generating a report, by the analysis module of the server, identifying the combination of the value of the environmental parameter and the value of the item of content parameter as associated with improperly rendered content.

20. The method of claim 16, wherein instantiating the virtual machine corresponding to the environmental information further comprises:
receiving, by the server, a number of requests for items of content from a plurality of client devices, each request comprising identical environmental information,
determining, from a counter maintained by the server, that the number of requests exceeds a predetermined threshold, and
instantiating the virtual machine corresponding to the environmental information, responsive to the determination, and
wherein rendering the item of content further comprises rendering each requested item of content, by the virtual machine; and
wherein capturing an image of the rendered item of content further comprises capturing an image of each rendered item of content, by the virtual machine.

* * * * *